INVENTOR.
JULES JACOBS
BY
ATTORNEY

Feb. 19, 1952 J. JACOBS 2,586,049
TRACTION DEVICE FOR VEHICLE WHEELS
Filed Nov. 22, 1949 3 Sheets-Sheet 2
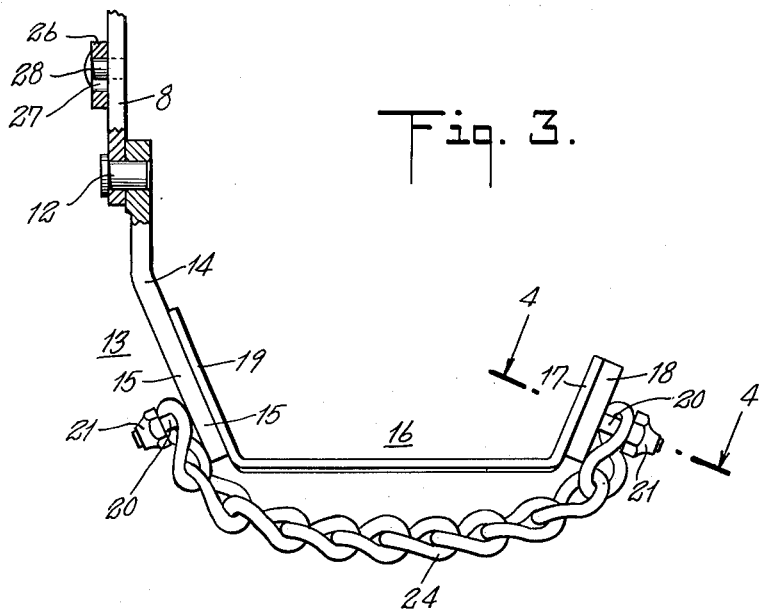
Fig. 3.
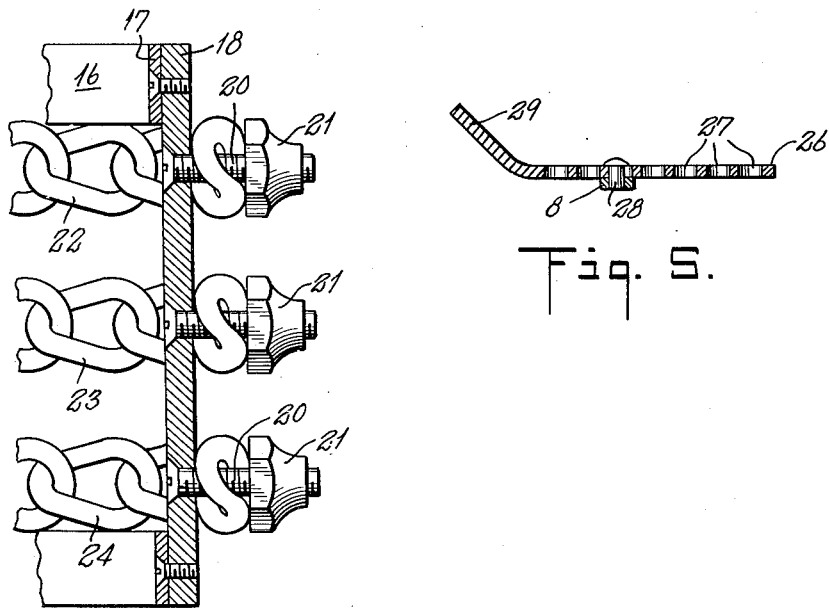
Fig. 4.
Fig. 5.
INVENTOR.
JULES JACOBS
BY
ATTORNEY Patented Feb. 19, 1952

2,586,049

UNITED STATES PATENT OFFICE 2,586,049

TRACTION DEVICE FOR VEHICLE WHEELS

Jules Jacobs, New City, N. Y.

Application November 22, 1949, Serial No. 128,787

6 Claims. (Cl. 152—217)

My invention comprehends an improved traction device for vehicle wheels which is highlighted by the fact that it may be expeditiously applied by one person without the necessity or bother of jacking-up the vehicle.

Broadly, the invention comprises a central crank having radial arms with the tire-tread engaging extremities equipped with traction elements, and an operating lever whereby the device, in its entirety, may be quickly mounted upon a wheel, and securely locked thereto so as to provide for maximum traction.

Specifically, the radial arms are pivoted at their inner ends to the central crank, and in turn, tire clamping members having transverse traction links are pivoted to the outer ends of the arms. At a suitable point on the crank an outwardly extending lever is fixed and is fashioned into a handle which is provided with a plurality of openings for engagement with a pin projecting laterally from an adjacent arm. Normally, due to presence of pivotal connections, the device is capable of being collapsed and kept in the trunk or other compartment of a vehicle. And in use, the arms and clamping members are extended about their respective pivots until the members loosely engage the periphery of the tire, say, at three separate points—then the lever is constrained in the appropriate direction to cause the crank to turn and the arms to be drawn inwardly. Thus the members are tightened against the periphery of the tire, whereupon the proper opening in the handle is forced over said pin and locked in place.

In the drawings:

Fig. 3 is a detailed side elevation of one of the tire clamping members taken along lines 3—3 of Fig. 2, and Fig. 4 is a transverse section along lines 4—4 of Fig. 3.

Fig. 5 is a longitudinal section of the lever handle on lines 5—5 of Fig. 2.

Figure 1:
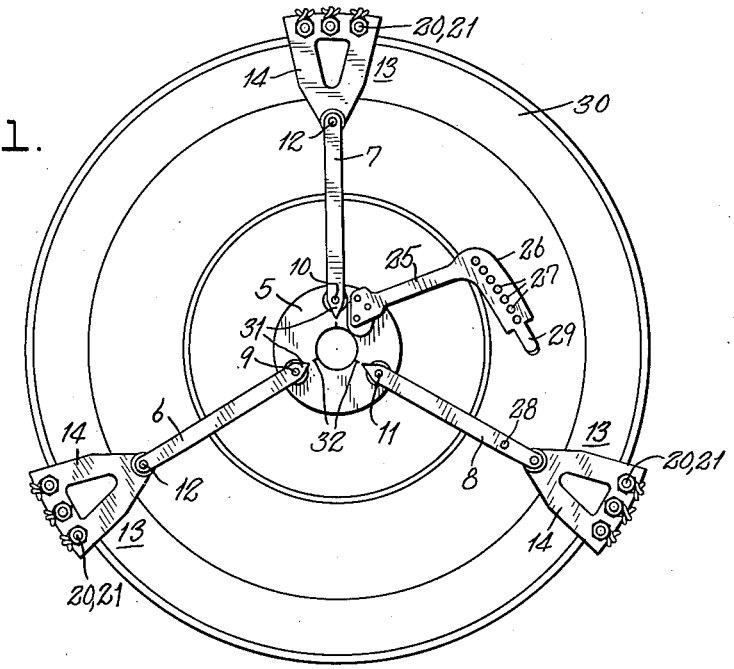
Fig. 1 is a side elevation of the invention showing its initial application to a wheel.

Referring more particularly to the drawings, 5 designates a central crank in the form of a disc, and having three radial arms 6, 7 and 8 pivoted thereto at equidistantly spaced points 9, 10 and 11. Each arm, at its outer end, is pivoted at 12 to a tire clamping member 13, shown best in Figs. 3 and 4, and consisting of a flared plate 14 carrying at its wider end 15 U-shaped frame 16. The outer flanged end 17 of the frame is reinforced with a strip 18 while the inner opposite flange 19 is similarly reinforced by the wider extremity 15 of the plate 14. Attached to the strip 18 and extremity 15 are a plurality of bolts 20 and nuts 21 which are employed to secure the chains 22, 23 and 24 to the outside of frame 16.

Also rigidly mounted on the crank 5 is a lever 25 with its outer extremity 26 constituting a resilient handle. The handle has a series of openings 27 for engagement with the pin 28 projecting laterally from arm 8, and the outer end of the handle is provided with a reduced outwardly deflected lip 29 (Fig. 5) to facilitate disengagement of the handle from the stud.

Figure 2:
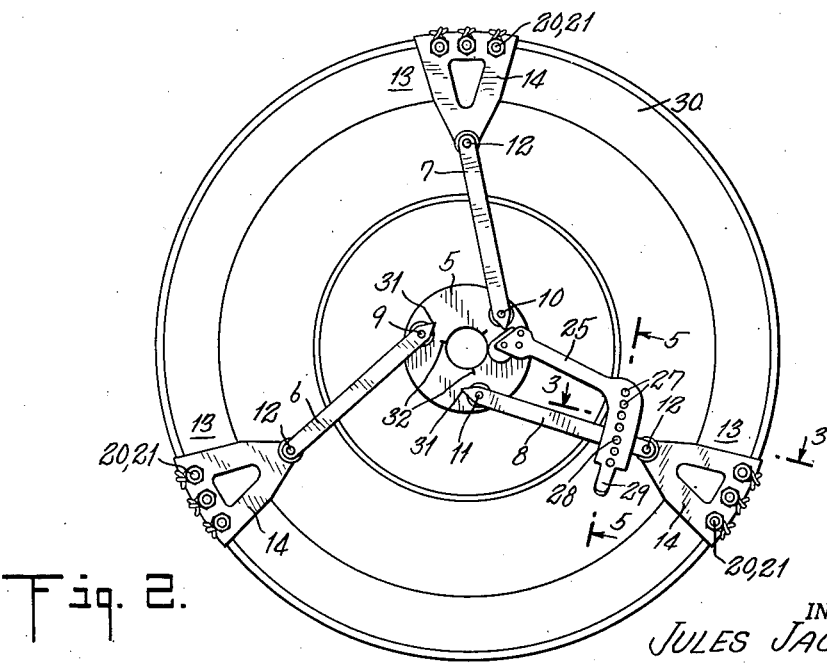
Fig. 2 is a similar view illustrating the ultimate position assumed by the various parts of the device when it has been finally adjusted and is ready for use.
Figure 6:
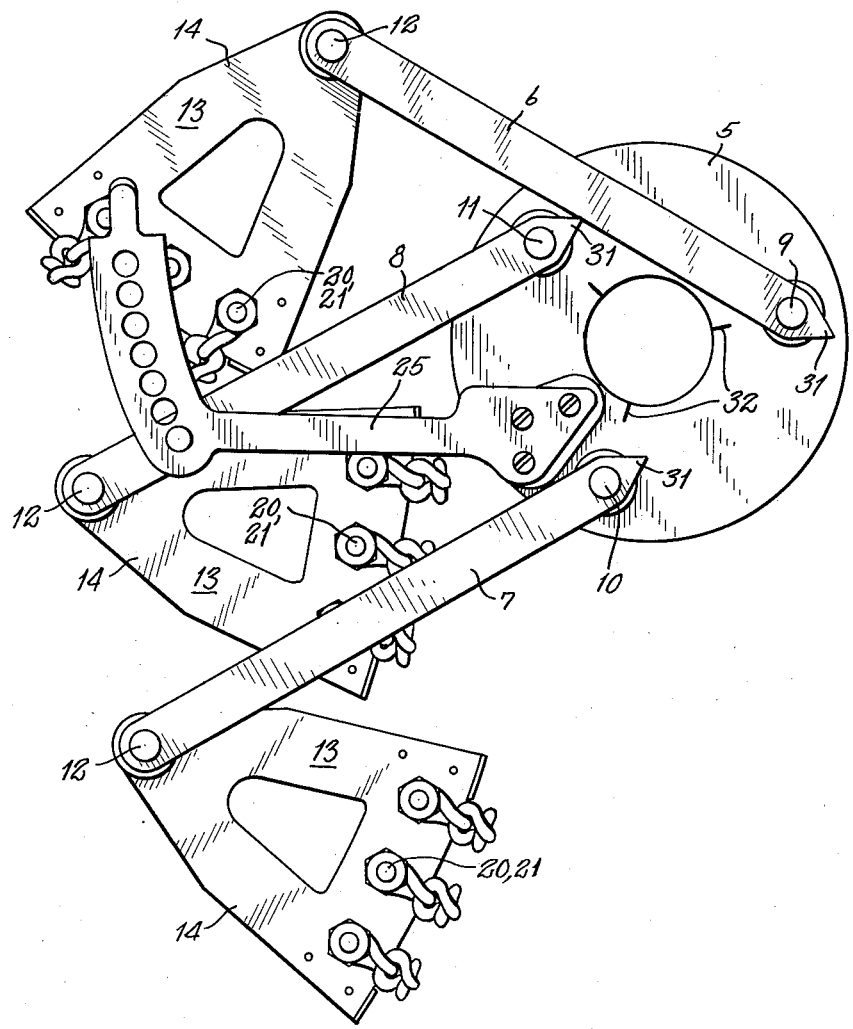
Fig. 6 is a top plan of the complete device collapsed.

When not in use the device is collapsed, as exhibited in Fig. 6, and, for example, may be stored in the trunk of an automobile. In use, arms 6, 7 and 8 are swung about their pivots with respect to crank 5 until arm 6 with its clamping member 13 is disposed at the top of the wheel 30 and arms 7 and 8 with their respective clamping members astride the wheel at opposite sides of its point of contact with the surface on which it rests. Having loosely and initially positioned the components (see Fig. 1), the handle 26 of lever 25 is grasped and forced towards arm 8, thus turning crank 5 and constraining arms 6, 7 and 8 out of register or in staggered relation with respect to the axis of the crank—in this manner tightly clamping frames 14 against the tread (see altered positions of arms in Fig. 2). Then the appropriate opening 27 is placed over the pin 28, the parts are locked in this position and the vehicle is ready to proceed (see Fig. 2).

It will be noted in the initial position of the components that the arms radiate in substantially true lines from the axis of crank, but that when they have been finally adjusted the arms—due to the turning of the crank and the consequent drawing of the inner ends of the arms towards the center—are offset or staggered from a true radial position relative the crank. The precise position of the arms varies in accordance with the size of the wheel or tire, and the variance in size, when the device is locked, is readily compensated for by the plurality of openings in the lever handle.

By pointing the inner terminals of the arms 5, 6 and 7, at 31 and causing the terminals to register with the scored lines 32 on the plate, an exact equidistant spacing of the arms can be obtained.

Application and removal of the device may be readily accomplished by one person and without jacking-up the wheel. When worn out, new chains may be substituted for the old ones.

In its broader aspects, the invention contemplates the employment not only of the various means described, but of equivalent means for performing the recited functions. For example, the number of radial arms may be increased or diminished the pivotal connections of the arms and tire clamping members may be eliminated. It is desired to reserve the right to effect such modifications as may come fairly within the scope of the appended claims.

I claim:

1. A device of the character described including a central turnable crank, radially disposed arms pivoted to the crank, tire clamping members pivoted to the outer ends of the arms, a pin carried by one of the arms, and a lever fixed to the crank, the crank being movable by the lever whereby the outer extremity of the latter is adjustably engageable with the pin to tighten and lock the members with respect to the tread.

2. A device of the character described including a central turnable crank, radially disposed arms pivoted to the crank, tire clamping members pivoted to the outer ends of the arms, a pin carried by one of the arms, and a lever fixed to the crank, the crank being movable by the lever whereby the outer extremity of the latter is adjustably engageable with the pin to tighten and lock the members with respect to the tread, the crank, arms, members and lever being swingable in nested relationship.

3. A device of the character described including a central disc-like turnable crank having scorings disposed thereon at equidistantly spaced points, radial arms pivoted to the crank, the outer ends of the arms having clamping members and the inner terminals of the arms being pointed to register with the scorings and thus provide for initial equidistant setting of the members.

4. A device of the character described including a central turnable crank, radially disposed arms pivoted to the crank, individual tire clamping members pivoted to the outer ends of the arms, a lever fixed to the crank and extending radially therefrom intermediately of two arms, the crank being movable by the lever whereby the lever may be brought nearer to one of the arms and means for releasably fastening the lever to the one arm to lock the tire clamping members to tire tread, the arms when initially adjusted radiating from the axis of the crank and when finally adjusted offset with respect to said axis.

5. A device of the character described including a central turnable crank, radially disposed arms pivoted to the crank, individual tire clamping members pivoted to the outer ends of the arms, a lever fixed to the crank and extending radially therefrom intermediately of two arms, the crank being movable by the lever whereby the lever may be brought nearer to one of the arms and means for releasably fastening the lever to the one arm to lock the tire clamping members to tire tread, the arms when initially adjusted radiating from the axis of the crank and when finally adjusted offset with respect to said axis, said crank, arms, tire clamping members and lever being swingable in a plane normal to the axis of the crank into a nested relationship.

6. A device of the character described including a central turnable crank, radially disposed arms pivoted to the crank, individual tire clamping members pivoted to the outer ends of the arms, a lever fixed to the crank and extending radially therefrom intermediately of two arms, the crank being movable by the lever whereby the lever may be brought nearer to one of the arms and means for releasably fastening the lever to the one arm to lock the tire clamping members to tire tread, the arms when initially adjusted radiating from the axis of the crank and when finally adjusted offset with respect to said axis, the inner terminals of the arms being pointed to register the scorings of the arms upon the crank being turned and the lever being brought nearer to one of the arms.

JULES JACOBS.

REFERENCES CITED

The following references are of record in the file of this patent:

UNITED STATES PATENTS

| Number | Name | Date |
|---|---|---|
| 1,537,592 | DuVall | May 12, 1925 |
| 1,822,748 | Rivers | Sept. 8, 1931 |
| 2,188,120 | Smith | Jan. 23, 1940 |
| 2,474,696 | Schwab | June 28, 1949 |
| 2,527,939 | Krider | Oct. 31, 1950 |